United States Patent
Furukawa

(10) Patent No.: US 8,142,937 B2
(45) Date of Patent: Mar. 27, 2012

(54) FUEL CELL SYSTEM

(75) Inventor: Kazuyoshi Furukawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 985 days.

(21) Appl. No.: 12/121,879

(22) Filed: May 16, 2008

(65) Prior Publication Data

US 2008/0286613 A1 Nov. 20, 2008

(30) Foreign Application Priority Data

May 18, 2007 (JP) ................................. 2007-133415

(51) Int. Cl.
*H01M 8/02* (2006.01)
(52) U.S. Cl. ........................................ 429/400; 429/512
(58) Field of Classification Search .................. 429/400
See application file for complete search history.

(56) References Cited

U.S. PATENT DOCUMENTS

| | | | |
|---|---|---|---|
| 2003/0039869 A1 | 2/2003 | Murakami et al. | |
| 2005/0064252 A1* | 3/2005 | Kusakabe et al. | 429/13 |
| 2005/0118470 A1* | 6/2005 | Harada et al. | 429/22 |
| 2006/0115700 A1 | 6/2006 | Kotani et al. | |
| 2006/0286420 A1* | 12/2006 | Koyama et al. | 429/23 |
| 2007/0196707 A1 | 8/2007 | Komachiya et al. | |

FOREIGN PATENT DOCUMENTS

| | | |
|---|---|---|
| JP | 2004-192919 A | 7/2004 |
| JP | 2005-174694 A | 6/2005 |
| JP | 2005-197211 A | 7/2005 |
| JP | 2006-156261 A | 6/2006 |
| JP | 2006-318669 A | 11/2006 |

\* cited by examiner

*Primary Examiner* — Patrick Ryan
*Assistant Examiner* — Brent Thomas
(74) *Attorney, Agent, or Firm* — Keating & Bennett, LLP

(57) ABSTRACT

A fuel cell system is capable of easily determining whether or not supply of gas to a cathode has been cut off after an issuance of a power generation stop command. The fuel cell system includes a cell stack which includes a plurality of fuel cells; a stop valve which is brought to a closed state as the power generation stop command is issued, thereby cutting off an inflow of air into a pipe, and therefore into the cell stack; a power generation sensor which detects a voltage of the cell stack after the issuance of the power generation stop command; and a CPU which controls an operation of the fuel cell system. When a main switch is turned off while the cell stack is in a power generating operation, an operation stop command and the power generation stop command are given to the CPU. After the power generation stop command is issued, the CPU determines whether or not air supply to the cell stack has been cut off, by comparing the voltage of the cell stack to a first threshold value.

12 Claims, 11 Drawing Sheets

FUEL CELL SYSTEM

BACKGROUND OF THE INVENTION

1. Field of the Invention

The present invention relates to a fuel cell system, and more specifically, relates to a fuel cell system which cuts off a supply of gas to a cathode in a fuel cell after an issuance of a power generation stop command.

2. Description of the Related Art

There is known a fuel cell system which cuts off a supply of air (gas) that contains oxygen (oxidizer) to a cathode after an issuance of a power generation stop command. In such a fuel cell system, if supply of air is not successfully cut off after a stoppage of power generating operation, there will be a problem of fuel cell deterioration caused by localized electrochemical reactions occurring in the fuel cell. In order to prevent this, it is necessary to determine whether or not the supply of air from outside has been successfully cut off after the issuance of the power generation stop command.

JP-A 2004-192919, for example, discloses a fuel cell system which determines the system's state of air-tightness based on detection results from pressure sensors after a stoppage of the power generating operation.

Also, JP-A 2006-318669 discloses a fuel cell system which determines whether or not oxidizer and fuel are supplied appropriately to a plurality of fuel cells during power generation, by making a comparison between an average of impedances in the fuel cells and an impedance in one of the fuel cells.

However, the technique according to JP-A 2004-192919 requires a plurality of pressure sensors, which results in a complicated system configuration.

The technique according to JP-A 2006-318669 determines the state of supply of the oxidizer and the fuel to the fuel cells during power generation, and does not determine whether or not the external supply of air has been cut off after a stoppage of power generating operation. The technique requires application of an AC signal to the fuel cells, which means that use of the technique according to JP-A 2006-318669 after a stoppage of power generating operation requires an external power source, etc.

SUMMARY OF THE INVENTION

In order to overcome the problems described above, preferred embodiments of the present invention provide a fuel cell system capable of easily determining whether or not a supply of gas after an issuance of power generation stop command has been cut off.

According to a preferred embodiment of the present invention, a fuel cell system includes a fuel cell which has a cathode; a detector arranged to detect an electrical variable regarding power generation in the fuel cell; an instruction unit arranged to issue a power generation stop command for the fuel cell; a cut off unit arranged to cut off a supply of gas containing oxidizer to the cathode after an issuance of the power generation stop command by the instruction unit; and determination unit arranged to determine presence or absence of an abnormality in the cut off unit based on a detection result from the detector after the issuance of the power generation stop command.

In a preferred embodiment of the present invention, a comparison is made between an electrical variable regarding power generation in the fuel cell, i.e., a voltage, current, etc., which is detected after an issuance of a power generation stop command and an electrical variable (i.e., a normal value of the electrical variable) when the supply of the gas is successfully cut off by the cut off unit. If the supply of gas is not successfully cut off, continued electrochemical reactions will increase the value of the electrical variable. By comparing the detected value of the electrical variable against the normal value of the electrical variable, it is possible to determine whether or not there is an abnormality in the cut off unit, i.e., whether or not the external supply of gas has been successfully cut off by the cut off unit. As described, it is possible to easily determine whether or not the supply of gas to the cathode after an issuance of a power generation stop command has been cut off successfully, by utilizing a value of an electrical variable regarding power generation in the fuel cell detected after the issuance of the power generation stop command, without relying upon pressure sensors or an AC power source.

Preferably, the fuel cell system further includes a first setting unit arranged to set permission or prohibition of a next-time power generation by the fuel cell, based on a detection result from the detector. In this case, the next power generation is prohibited if the detected value of the electrical variable is significantly greater than the normal value of the electrical variable. When the detected value is significantly greater than the normal value, there is a risk that a serious abnormality is present in the cut off unit, which will cause a major leak of the gas at the time of next power generation, making it impossible to supply the oxidizer uniformly to the cathode. Therefore, by prohibiting the next power generation in this case, it becomes possible to reduce deterioration of the fuel cell.

Further, preferably, the determination unit determines presence or absence of an abnormality in the cut off unit based on a result of comparison between a detection result from the detector and a first threshold value, whereas the first setting unit makes a setting for permission or prohibition of a next-time power generation by the fuel cell based on a result of comparison between a detection result from the detection unit and a second threshold value which is greater than the first threshold value. In this case, the cut off unit is determined to be normal (sound) if the detection result from the detector is smaller than the first threshold value, whereas the cut off unit is determined to have an abnormality if the detection result is not smaller than the first threshold value. Further, power generation by the fuel cell is prohibited the next time if the detection result from the detector is not smaller than the second threshold values. As described, it is possible to easily and appropriately determine whether or not there is an abnormality in the cut off unit by using the first threshold value which is predetermined depending on the normal value of the electrical variable. Also, it is possible to easily and appropriately set a permission or prohibition for the next power generation, by using the second threshold value which is a predetermined value greater than the first threshold value.

Further preferably, the fuel cell system further includes a timer arranged to measure a time from the issuance of the power generation stop command. With this arrangement, the determination unit determines presence or absence of an abnormality in the cut off unit based on a detection result from the detector detected after a lapse of a predetermined time measured by the timer. For a while after the external supply of gas is cut off, the electrochemical reactions continue in the fuel cell, using the residual oxidizer remaining in the system. By waiting for a predetermined time as described above after the power generation stop command is issued, the detection on the electrical variable is performed under a state where all residual oxidizer has been depleted in the system if the gas supply has been successfully cut off, i.e., if the cut off unit is normal (sound). This arrangement makes it possible to use a wide gap between a normal value and an abnormal value of the electrical variable, which then makes it possible to improve reliability of the determination result.

Preferably, the fuel cell system further includes a fuel supply arranged to supply the anode of the fuel cell with a fuel, and the fuel supply supplies the fuel to the anode after the issuance of the power generation stop command. By supplying fuel to the anode even after the power generation stop command is issued as described, it becomes possible to ensure that the all residual oxidizer has been depleted in the system if the cut off unit is normal. This makes it possible to further improve reliability of the determination result.

Further, preferably, the fuel cell system further includes a fuel supply arranged to supply the anode of the fuel cell with a fuel, and the fuel supply supplies the fuel to the anode after the determination unit has determined that there is an abnormality in the cut off unit. In this case, it becomes possible to prevent deterioration of the fuel cell more effectively by supplying the fuel to the anode thereby correcting non-uniform fuel distribution, even if the system has to be left without service for a long time due to any reason, for example, that the operator is too busy after an abnormality has been indicated.

Further preferably, the fuel supply supplies the fuel to the anode at a predetermined time interval after the determination unit has determined the presence of an abnormality in the cut off unit. Supplying the fuel to the anode at a predetermined time interval as described above makes it possible to prevent non-uniform fuel distribution in the fuel cell, and therefore to prevent deterioration of the fuel cell even more effectively.

Preferably, the fuel cell system further includes a second setting unit arranged to set the predetermined time. With this arrangement, the determination unit determines presence or absence of an abnormality in the cut off unit based on a result of comparison between a detection result from the detector and the first threshold value, whereas the second setting unit sets the predetermined time based on a result of comparison between a detection result from the detector and a second threshold value which is greater than the first threshold value. In this case, the cut off unit is determined to be sound if the detection result from the detector is smaller than the first threshold value, whereas the cut off unit is determined to have an abnormality if the detection result from the detector is not smaller than the first threshold value. Further, the cut off unit is determined to have a minor abnormality if the detection result from the detector is not smaller than the first threshold value and smaller than the second threshold value, whereas the cut off unit is determined to have a major abnormality if the detection result from the detector is not smaller than the second threshold value. The predetermined time, which is a time interval at which the fuel is supplied to the anode, is set to a relatively long time for the minor abnormality whereas it is set to a shorter time for the major abnormality, than for the minor abnormality. Therefore, after the cut off unit is determined to have an abnormality, it is possible to supply the fuel to the anode at an appropriate time interval which takes into account the severity of the abnormality.

Preferably, the fuel cell system further includes a first notification unit arranged to notify a determination result from the determination unit. By notifying a human operator of the abnormality existing in the cut off unit, the operator is given an opportunity to recognize the abnormality and take necessary procedures. This helps reduce deterioration of the fuel cell.

Further, preferably, the fuel cell system has a fuel cell stack which includes a plurality of the fuel cells, the detector is capable of detecting the electrical variable from at least two of the fuel cells located respectively at an end and the other end of the fuel cell stack, and the fuel cell system further includes an estimation unit arranged to estimate an abnormality location in the cut off unit based on a plurality of detection results from the detector. In this case, at least two measurements are made, at fuel cells located respectively at an end and the other end of the fuel cell stack, for a value of the electrical variable. This makes it possible to estimate at least which side of the fuel cell, i.e., upstream side of the most upstream fuel cell (including the most upstream fuel cell) or downstream side of the most downstream fuel cell (including the most downstream fuel cell), the abnormality exists. Further, if detection is made for a value of the electrical variable in the fuel cell stack, then it becomes possible to estimate whether the abnormality exists on the upstream side of the most upstream fuel cell, the downstream side of the most downstream fuel cell, or any of the fuel cells between the most upstream fuel cell and the most downstream fuel cell.

Further preferably, the fuel cell system further includes a second notification unit arranged to notify an estimation result from the estimation unit. Notifying the operator of an estimation result about the abnormality location as described helps reduce a burden required to identify the abnormality location.

Fuel cell systems mounted on transportation equipment are subjected to vibration, etc., and their cut off unit is prone to deterioration. Preferred embodiments of the present invention make it possible to easily determine whether or not there is an abnormality in the cut off unit, and therefore, the present invention is suitable for transportation equipment.

The above-described and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described, with reference to the drawings.

The preferred embodiments are cases in which a fuel cell system 100 according to the present invention is provided in a motorbike 10 as an example of transportation equipment.

The description will first cover the motorbike 10. It is noted that the terms left and right, front and rear, up and down as used in the preferred embodiments of the present invention are determined from the normal state of riding, i.e., as viewed by the driver sitting on the driver's seat of the motorbike 10, with the driver facing toward a handle 24.

Figure 1:
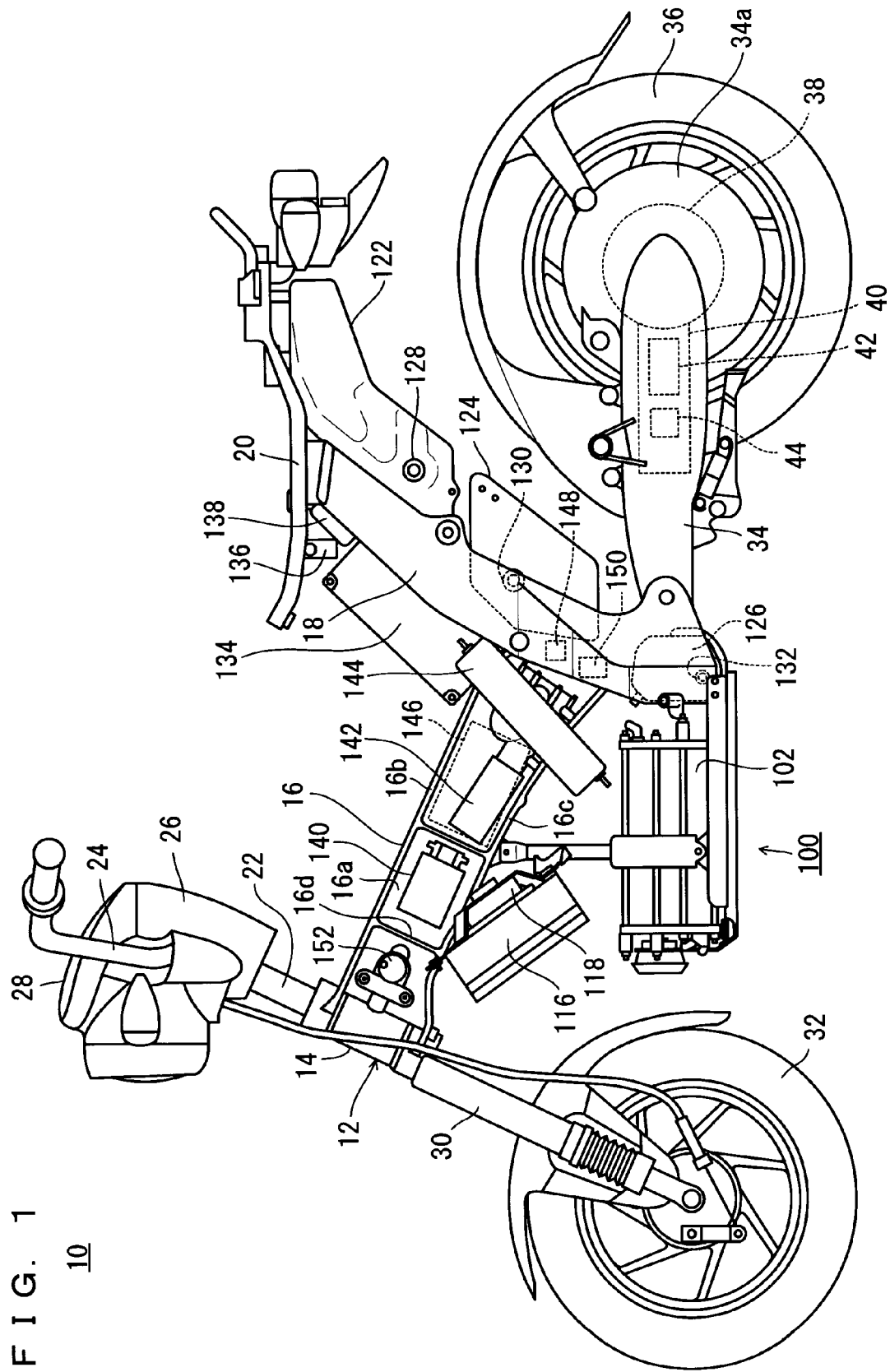
FIG. 1 is a left side view of a motorbike according to a preferred embodiment of the present invention.

Referring to FIG. 1, the motorbike 10 preferably includes a vehicle frame 12. The vehicle frame 12 has a head pipe 14, a front frame 16 which has an I-shaped vertical section and extends in a rearward and downward direction from the head pipe 14, and a rear frame 18 which is connected with a rear end of the front frame 16 and rising in a rearward and upward direction.

The front frame 16 preferably includes a plate member 16a which has a width in the vertical direction and extends in a rearward and downward direction, substantially perpendicularly to the lateral directions of the vehicle; flanges 16b, 16c which are located respectively at an upper end edge and a lower end edge of the plate member 16a, and extending in a rearward and downward direction and having a width in the lateral directions; and reinforcing ribs 16d protruding from both surfaces of the plate member 16a. The reinforcing ribs 16d and the flanges 16b, 16c define storage walls, providing compartments on both surfaces of the plate member 16a defining storage spaces for components of the fuel cell system 100 to be described later.

The rear frame 18 preferably includes a pair of left and right plate members each having a width in the front and rear directions, extending in a rearward and upward direction, and sandwiching a rear end of the front frame 16. The pair of plate members of the rear frame 18 have their upper end portions provided with seat rails 20 fixed thereto, for installation of an unillustrated seat. Note that FIG. 1 shows the left plate member of the rear frame 18.

A steering shaft 22 is pivotably inserted in the head pipe 14. A handle support 26 is provided at an upper end of the steering shaft 22, to which the handle 24 is fixed. The handle support 26 has an upper end provided with a display/operation board 28.

Figure 3:
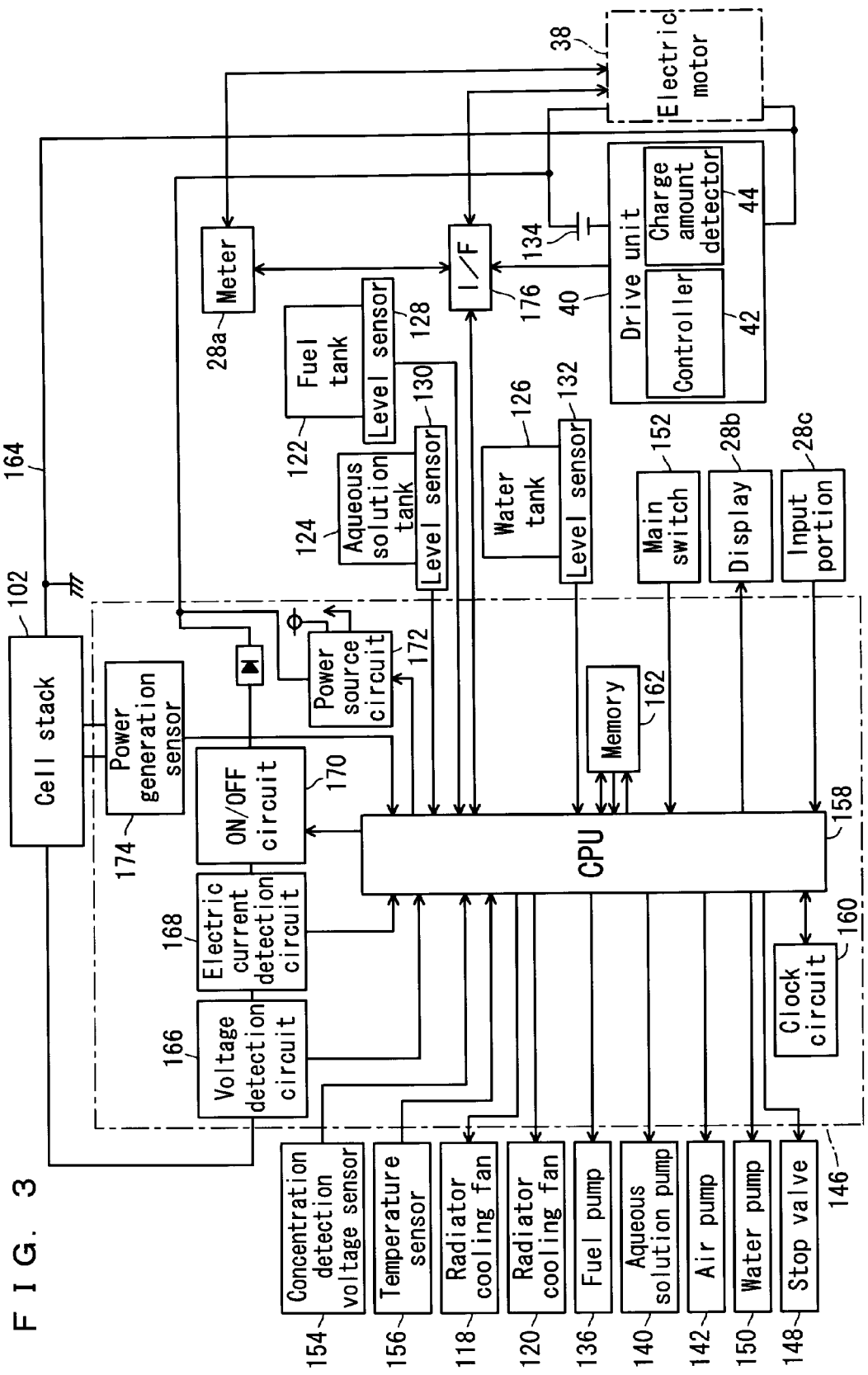
FIG. 3 is a block diagram which shows an electric configuration of the fuel cell system according to a preferred embodiment of the present invention.

Referring also to FIG. 3, the display/operation board 28 preferably is an integrated dashboard including a meter 28a for measuring and displaying various data concerning an electric motor 38 (to be described later); a display 28b provided by, e.g., a liquid crystal display for providing the driver with a variety of information; and an input portion 28c for inputting a variety of commands and data.

As shown in FIG. 1, a pair of left and right front forks 30 extend from a bottom end of the steering shaft 22. Each of the front forks 30 includes a bottom end rotatably supporting a front wheel 32.

The rear frame 18 includes a lower end which pivotably supports a swing arm (rear arm) 34. The swing arm 34 has a rear end 34a incorporating the electric motor 38 of an axial gap type, for example, which is connected with the rear wheel 36 to rotate the rear wheel 36. The swing arm 34 also incorporates a drive unit 40 which is electrically connected with the electric motor 38. The drive unit 40 includes a motor controller 42 for controlling the rotating drive of the electric motor 38, and a charge amount detector 44 for detecting an amount of charge in the secondary battery 134 (to be described later).

The motorbike 10 as described is equipped with a fuel cell system 100, with its constituent members being disposed along the vehicle frame 12. The fuel cell system 100 generates electric energy for driving the electric motor 38 and other system components.

Hereinafter, the fuel cell system 100 will be described, with reference to FIG. 1 and FIG. 2.

The fuel cell system 100 is preferably a direct methanol fuel cell system which uses methanol (an aqueous solution of methanol) directly without reformation, for generation of electric energy (power generation).

The fuel cell system 100 includes a fuel cell stack (hereinafter simply called cell stack) 102. As shown in FIG. 1, the cell stack 102 is suspended from the flange 16c, and is disposed below the front frame 16.

Figure 2:
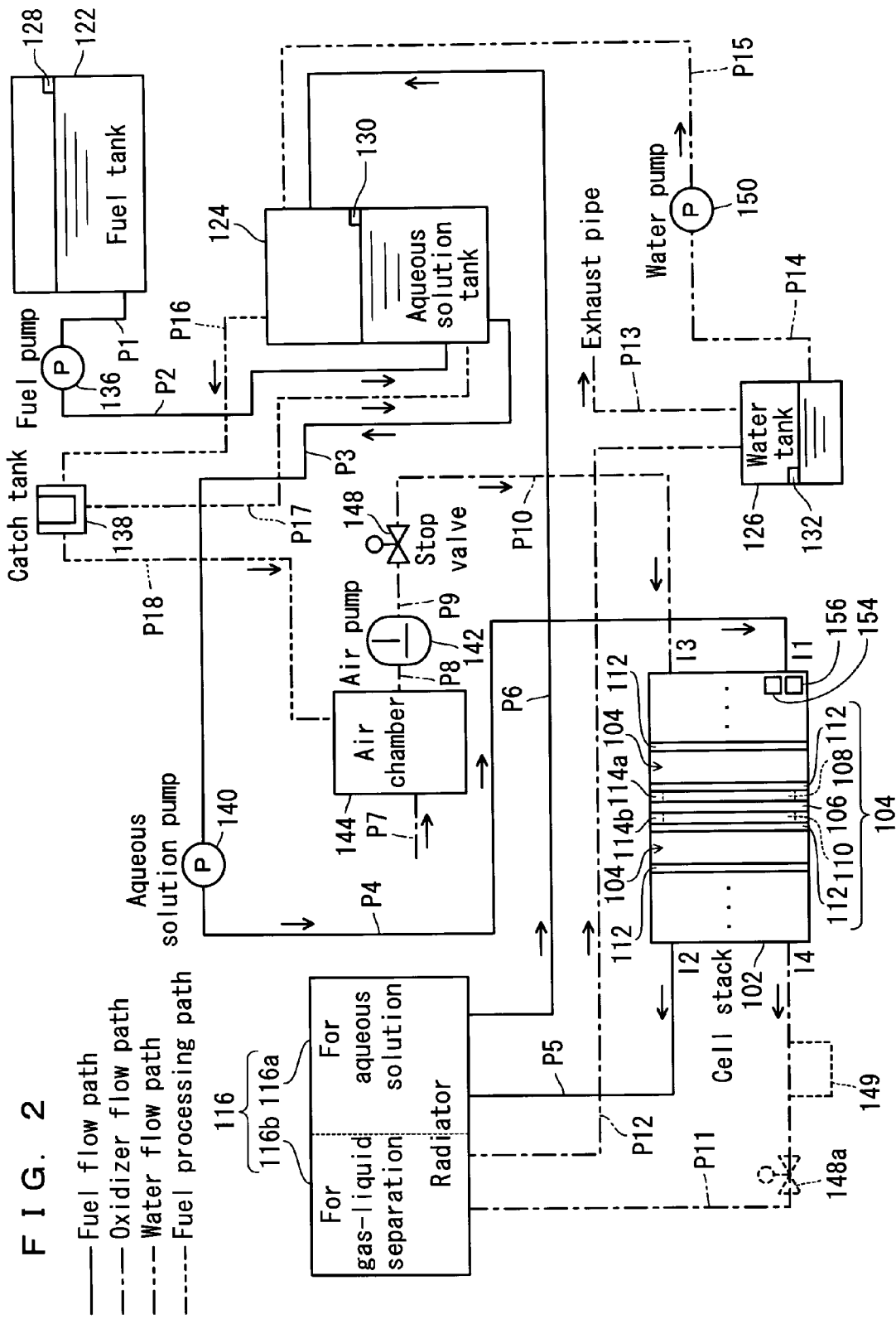
FIG. 2 is a system diagram which shows piping in a fuel cell system according to a preferred embodiment of the present invention.

As shown in FIG. 2, the cell stack 102 includes not fewer than three (for example, seventy-six according to the present preferred embodiment) fuel cells (individual fuel cells) 104 each capable of generating electric power by means of electrochemical reactions between hydrogen ions from methanol and oxygen (oxidizer). The fuel cells 104 are piled (stacked) and connected in series.

Figure 4:
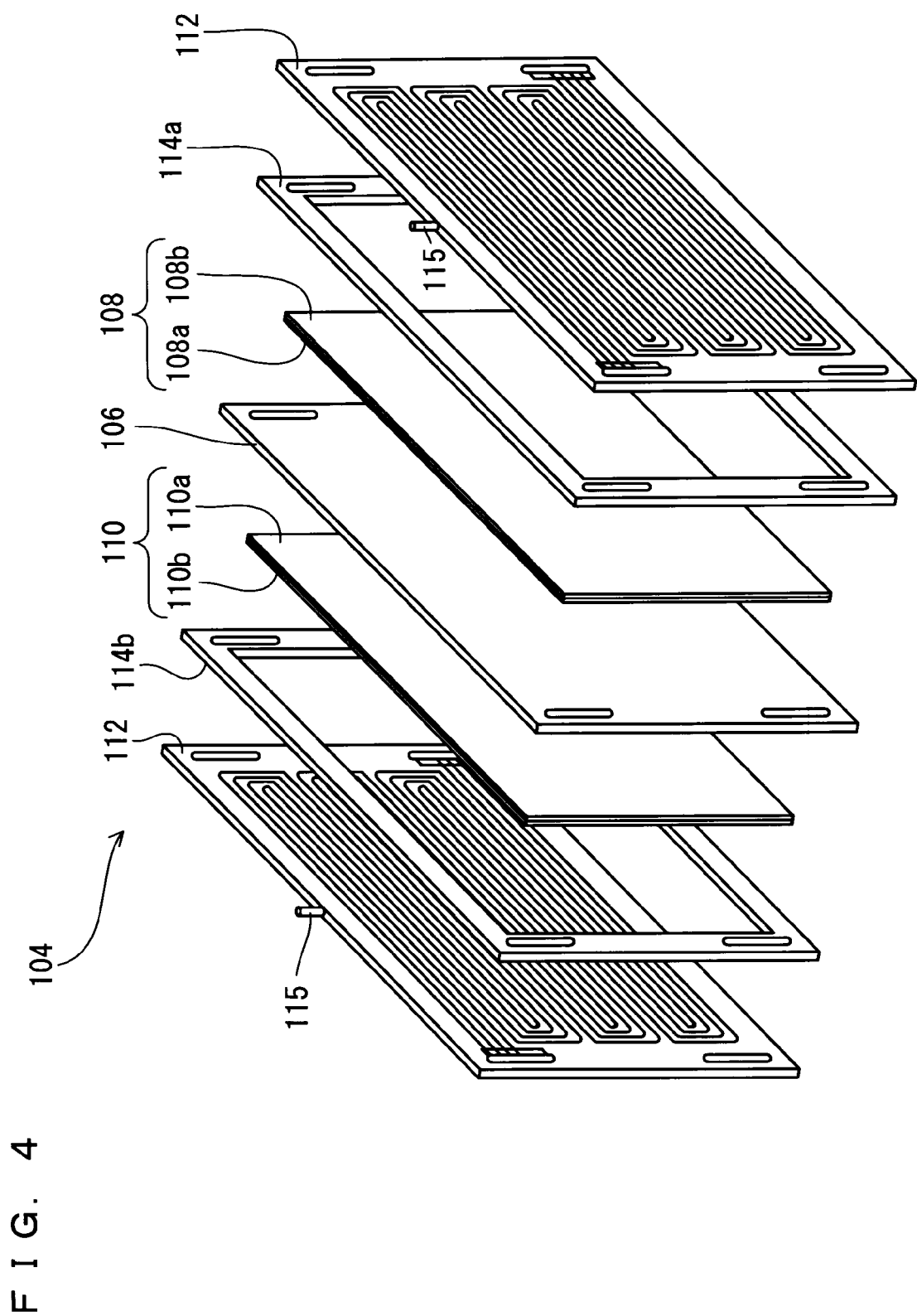
FIG. 4 is an exploded perspective view which shows a composition of the fuel cell.

Referring also to FIG. 4, each fuel cell 104 includes an electrolyte film 106 provided by a solid polymer film, an anode (fuel electrode) 108 and a cathode (air electrode) 110 opposed to each other to sandwich the electrolyte film 106, and a pair of separators 112 opposed to each other to sandwich a Membrane Electrode Assembly (MEA) which is constituted by the electrolyte film 106, the anode 108 and the cathode 110.

The anode 108 includes a platinum catalyst layer 108a provided on a side facing the electrolyte film 106, and an electrode 108b provided on a side facing the separator 112. The cathode 110 includes a platinum catalyst layer 110a provided on a side facing the electrolyte film 106, and an electrode 110b provided on a side facing the separator 112.

Between the electrolyte film 106 and the separator 112 which sandwich the anode 108, there is inserted a frame-shaped gasket 114a into which the anode 108 is fitted. Likewise, between the electrolyte film 106 and the separator 112 which sandwich the cathode 110, there is inserted a frame-shaped gasket 114b into which the cathode 110 is fitted. Therefore, the anode 108 is shielded by the electrolyte film 106, the separator 112 and the gasket 114a, whereas the cathode 110 is shielded by the electrolyte film 106, the separator 112 and the gasket 114b.

The separator 112 is provided by an electrically conductive material such as carbon composite, and is used commonly by two mutually adjacent ones of the fuel cells 104 (see FIG. 2). The separator 112 has a main surface facing the anode 108, formed with a meandering groove for a supply of aqueous methanol solution to the electrode 108b in the anode 108. Likewise, the separator 112 has a main surface facing the cathode 110, formed with a meandering groove for a supply of air (gas) which contains oxygen (oxidizer) to the electrode 110b in the cathode 110. Further, the separator 112 has an end surface provided with a measurement terminal 115 for connection with a power generation sensor 174 (to be described later).

As shown in FIG. 1, a radiator unit 116 is disposed below the front frame 16, above the cell stack 102.

As shown in FIG. 2, the radiator unit 116 includes integrally therein, a radiator 116a for aqueous solution and a radiator 116b for gas-liquid separation. On a back side of the radiator unit 116, there is a fan 118 provided to cool the radiator 116a, and there is another fan 120 (see FIG. 3) provided to cool the radiator 116b. In FIG. 1, the radiators 116a and 116b are disposed side by side, with one on the left-hand side and the other on the right-hand side, but only shows the fan 118 for cooling the left-hand side radiator 116a.

A fuel tank 122, an aqueous solution tank 124 and a water tank 126 are disposed in this order from top to bottom, between the pair of plate members in the rear frame 18.

The fuel tank 122 contains a methanol fuel (high concentration aqueous solution of methanol) having a high concentration level (containing methanol at approximately 50 wt %, for example) which is used as the fuel for the electrochemical reaction in the cell stack 102. The aqueous solution tank 124 contains aqueous methanol solution, which is a solution of the methanol fuel from the fuel tank 122 diluted to a suitable concentration (containing methanol at approximately 3 wt %, for example) for the electrochemical reaction in the cell stack 102. The water tank 126 contains water to be supplied to the aqueous solution tank 124.

The fuel tank 122 is provided with a level sensor 128, the aqueous solution tank 124 is provided with a level sensor 130, and the water tank 126 is provided with a level sensor 132. The level sensors 128, 130 and 132 are preferably float sensors, respectively, for example, in order to detect the height of liquid (liquid level) in the respective tanks.

In front of the fuel tank 122 and above the front frame 16 is the secondary battery 134. The secondary battery 134 stores the electric power from the cell stack 102, and supplies the electric power to the electric components in response to commands from a controller 146 (to be described later). Above the secondary battery 134, a fuel pump 136 is disposed. Further, a catch tank 138 is disposed in front of the fuel tank 122, i.e., above and behind the secondary battery 134.

An aqueous solution pump 140 and an air pump 142 are housed in the storage space on the left side of the front frame 16. On the left side of the air pump 142 is an air chamber 144. The controller 146, a stop valve 148 and a water pump 150 are disposed in the storage space on the right side of the front frame 16.

Further, a main switch 152 is provided in the front frame 16, penetrating the storage space in the front frame 16 from right to left. Turning on the main switch 152 provides an operation start command to the controller 146 and turning off the main switch 152 provides an operation stop command to the controller 146. When the main switch 152 is turned off during the power generating operation of the cell stack 102, the operation stop command and a power generation stop command are supplied to the controller 146.

As shown in FIG. 2, the fuel tank 122 and the fuel pump 136 are connected with each other by a pipe P1. The fuel pump 136 and the aqueous solution tank 124 are connected with each other by a pipe P2. The aqueous solution tank 124 and the aqueous solution pump 140 are connected with each other by a pipe P3. The aqueous solution pump 140 and the cell stack 102 are connected with each other by a pipe P4. The pipe P4 is connected with an anode inlet I1 of the cell stack 102. By driving the aqueous solution pump 140, aqueous methanol solution is supplied to the cell stack 102.

A voltage sensor 154 is provided near the anode inlet I1 of the cell stack 102 in order to detect concentration information, which reflects the concentration of aqueous methanol solution (the ratio of methanol in the aqueous methanol solution) supplied to the cell stack 102, using an electrochemical characteristic of the aqueous methanol solution. The voltage sensor 154 detects an open-circuit voltage of the fuel cell 104, and the detected voltage value defines electrochemical concentration information. Based on the concentration information, the controller 146 detects the concentration of the aqueous methanol solution supplied to the cell stack 102.

Near the anode inlet I1 of the cell stack 102, a temperature sensor 156 is provided in order to detect the temperature of aqueous methanol solution supplied to the cell stack 102 as the temperature of the cell stack 102.

The cell stack 102 and the aqueous solution radiator 116a are connected with each other by a pipe P5, and the radiator 116a and the aqueous solution tank 124 are connected with each other by a pipe P6. The pipe P5 is connected with an anode outlet I2 of the cell stack 102.

The pipes P1 through P6 serve primarily as a flow path for fuel.

A pipe P7 is connected with the air chamber 144. The air chamber 144 and the air pump 142 are connected with each other by a pipe P8 whereas the air pump 142 and the stop valve 148 are connected with each other by a pipe P9. The stop valve 148 and the cell stack 102 are connected with each other by the pipe p10. The pipe P10 is connected with a cathode inlet I3 of the cell stack 102. By driving the air pump 142, air containing oxygen (oxidizer) from outside is supplied to the cell stack 102.

The cell stack 102 and the gas-liquid separation radiator 116b are connected with each other by a pipe P11. The radiator 116b and the water tank 126 are connected with each other by a pipe P12. The water tank 126 is provided with a pipe (an exhaust pipe) P13. The pipe P11 is connected with a cathode outlet I4 of the cell stack 102, and is routed up toward the radiator 116b without becoming lower than the cathode outlet I4. The pipe P13 is provided at an exhaust discharge outlet of the water tank 126, and discharges exhaust gas from the cell stack 102 to outside.

The pipes P7 through P13 serve primarily as a flow path for oxidizer.

When generating power, the stop valve 148 is brought to an open state, and the air pump 142 is driven. In this operation, air (gas) which contains oxygen (oxidizer) is introduced from outside and is supplied to the cell stack 102. The air supplied to the cell stack 102 passes through the grooves in the separator 112 in each fuel cell 104, and is supplied to the electrode 110b in the cathode 110.

When stopping the power generation, on the other hand, the air pump 142 is stopped, and the stop valve 148 is brought to a closed state. This cuts off the supply of external air to the pipe P10, i.e., to the cathode inlet I3. Also, bringing the stop valve 148 to the closed state prevents water vapor from flowing back to the air pump 142, thereby preventing corrosion problems inside the air pump 142.

After the stoppage of the air pump 142, the pipe P11 is filled near the cathode outlet I4, by water which has resulted from the electrochemical reactions (power generation) and by aqueous methanol solution which has come as a result of crossover transfer from the anode 108 to the cathode 110 in each fuel cell 104. This filling occurs due to the design that aqueous methanol solution, which comes from the cathode outlet I4 near the bottom of the cell stack 102, flows into the pipe P11 which extends upward without passing any location lower than the cathode outlet I4. The pipe P11 which is filled with aqueous methanol solution after a stoppage of power generating operation (after a stoppage of the air pump 142) makes it possible to prevent external air from flowing into the cathode outlet I4 via the pipe P13, the water tank 126, the pipe P12, the radiator 116b and the pipe P11.

As described, inflow of air into the cathode inlet I3 and into the cathode outlet I4 is cut off, and air supply to the cathode 110 in each fuel cell 104 is cut off after a stoppage of power generating operation.

The water tank 126 and the water pump 150 are connected with each other by a pipe P14, whereas the water pump 150 and the aqueous solution tank 124 are connected with each other by a pipe P15.

The pipes P14, P15 serve as a flow path for water.

The aqueous solution tank 124 and the catch tank 138 are connected with each other by pipes P16, P17. The catch tank 138 and the air chamber 144 are connected with each other by a pipe P18.

The pipes P16 through P18 define a flow path for fuel processing.

Next, reference will be made to FIG. 3, to cover an electrical configuration of the fuel cell system 100.

The controller 146 of the fuel cell system 100 preferably includes a CPU 158 for performing necessary calculations and controlling operations of the fuel cell system 100; a clock circuit 160 which gives the CPU 158 a clock signal; a memory 162 provided by, e.g., an EEPROM for storing programs and table data for controlling the operations of the fuel cell system 100 as well as calculation data, etc.; a voltage detection circuit 166 for detecting a voltage in an electric circuit 164 to connect the cell stack 102 with the electric motor 38; an electric current detection circuit 168 for detecting an electric current which passes through the electric circuit 164; an ON/OFF circuit 170 for opening and closing the electric circuit 164; a power source circuit 172 for providing the electric circuit 164 with a predetermined voltage; and a power generation sensor 174 for detecting an electrical variable regarding power generation in the cell stack 102.

Figure 5:
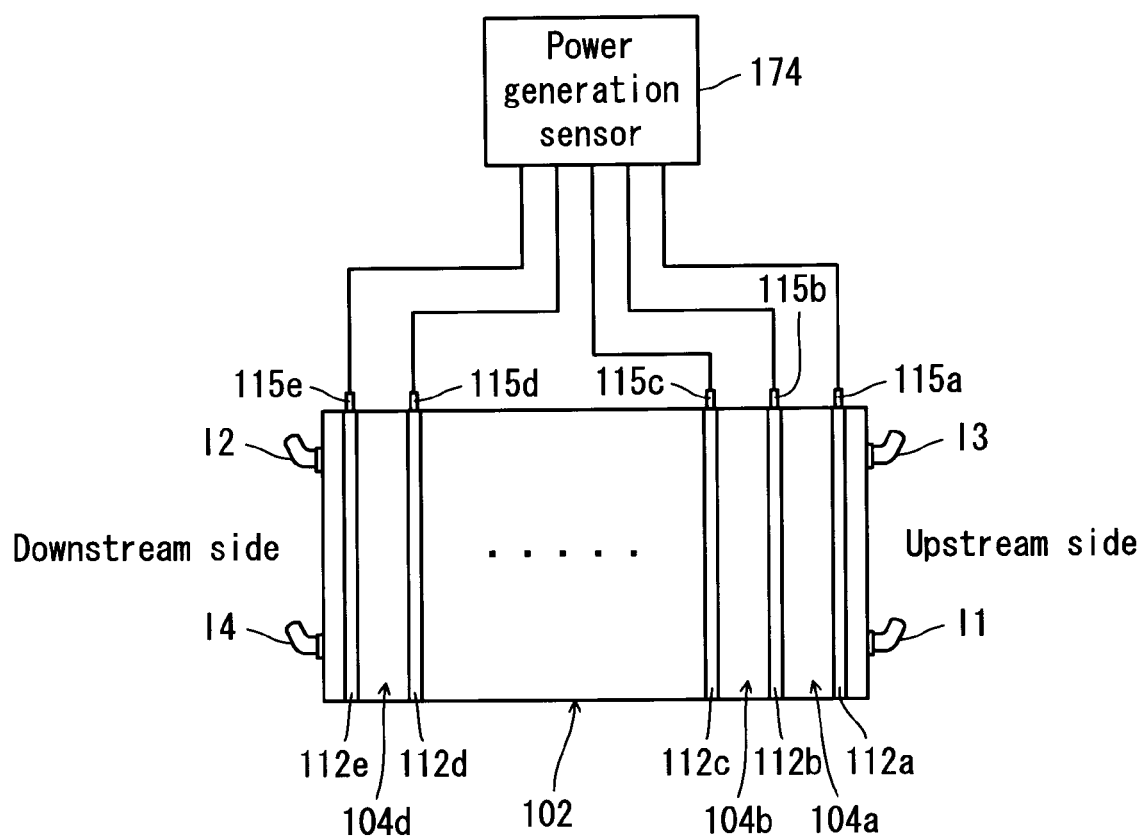
FIG. 5 is a schematic diagram which shows how a power generation sensor is connected with each fuel cell.

Referring to FIG. 5, the power generation sensor 174 is connected with the measurement terminal 115a-115e of each separator 112a-112e preferably via a lead wire, etc. The power generation sensor 174 is capable of detecting a voltage of the cell stack 102 and a voltage of each fuel cell 104 which constitutes the cell stack 102, as an electrical variable regarding power generation.

It should be noted here that in FIG. 5, the fuel cell which is at an end closest to the anode inlet I1 and the cathode inlet I3 (upstream end) is indicated by a reference symbol 104a, with the next fuel cell being indicated by a reference symbol 104b. Also, the separators which constitute the fuel cells 104a, 104b are indicated by reference symbols 112a, 112b, 112c sequentially from the upstream side, with the measurement terminals in the separators 112a, 112b, 112c being indicated by reference symbols 115a, 115b, 115c respectively. The fuel cell which is at an end closest to the anode outlet I2 and the cathode outlet I4 (downstream end) is indicated by a reference symbol 104d. The separators which constitute the fuel cell 104d are indicated by reference symbols 112d, 112e, sequentially from the upstream side, with the measurement terminals in the separators 112d, 112e being indicated by reference symbols 115d, 115e respectively.

The power generation sensor 174 detects the voltage of the fuel cell 104a via the measurement terminal 115a of the separator 112a and the measurement terminal 115b of the separator 112b, then detects the voltage of the fuel cell 104b via the measurement terminal 115b of the separator 112b and the measurement terminal 115c of the separator 112c, and repeats the same detection procedure for the other fuel cells 104. Thus, the power generation sensor 174 detects the voltage of each fuel cell 104 in the cell stack 102 sequentially. Note that the voltage detection for these fuel cells 104 may be made in any order.

The power generation sensor 174 also detects the voltage of the cell stack 102 (a sum of the voltages in all of the fuel cells 104) via the measurement terminal 115a of the separator 112a and the measurement terminal 115e of the separator 112e.

Returning to FIG. 3, the CPU 158 of the controller 146 is supplied with input signals from the main switch 152 and the input portion 28c. Also, the CPU 158 is supplied with detection signals from the level sensors 128, 130 and 132, and detection signals from the voltage sensor 154 and the temperature sensor 156. Further, the CPU 158 is supplied with voltage values detected by the voltage detection circuit 166, electric current values detected by the electric current detection circuit 168 and voltage values detected by the power generation sensor 174.

The CPU 158 controls system components such as the fuel pump 136, the aqueous solution pump 140, the air pump 142, the water pump 150, the fans 118, 120 and the stop valve 148. Also, the CPU 158 controls the display 28b which displays various kinds of information for the driver of the motorbike 10. Further, the CPU 158 controls the ON/OFF circuit 170 for opening and closing the electric circuit 164.

The secondary battery 134 complements the output from the cell stack 102, by being charged with electric power from the cell stack 102 and discharging the electricity to supply power to the electric motor 38, the system components, etc.

The electric motor 38 is connected with the meter 28a for measuring various data concerning the electric motor 38. The various data obtained by the meter 28a are supplied to the CPU 158 via an interface circuit 176. Also, the CPU 158 is supplied with the charge amount detected by the charge amount detector 44 via the interface circuit 176. The CPU 158 calculates a charge rate of the secondary battery 134 based on the detected charge amount and a capacity of the secondary battery 134.

Figure 7:
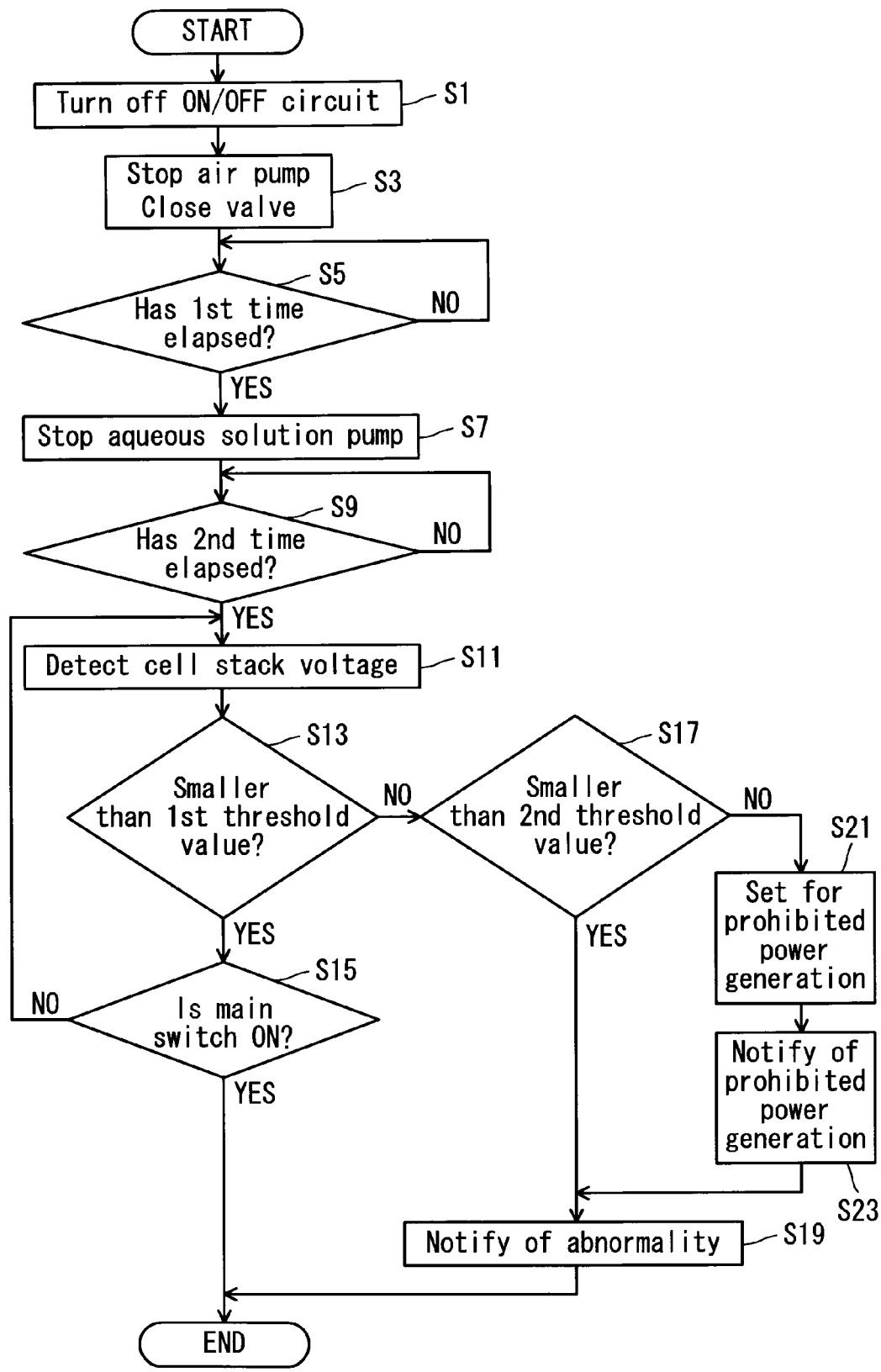
FIG. 7 is a flowchart which shows an example of primary operation of the fuel cell system according to a preferred embodiment of the present invention.
Figure 8:
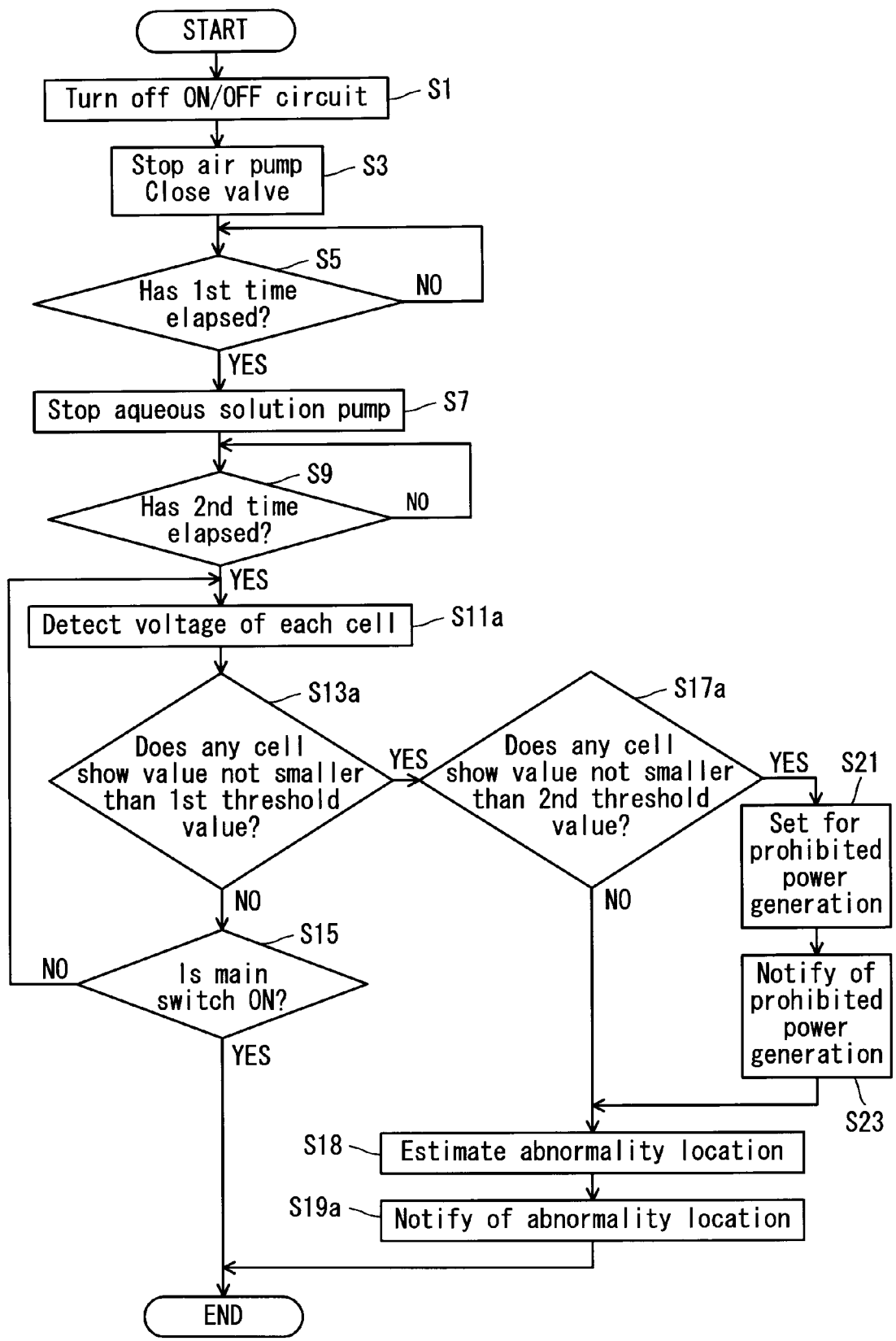
FIG. 8 is a flowchart which shows another example of primary operation of the fuel cell system according to a preferred embodiment of the present invention.

The memory 162 stores programs for performing the operations described in FIG. 7 through FIG. 11, a first and a second threshold values to be used in the operations in FIG. 7 and FIG. 8, a permission flag, etc. The permission flag is used in a setting that determines whether or not power generation in the cell stack 102 will be permitted after starting the next operation.

In the present preferred embodiment, the power generation sensor 174 preferably defines the detector, the main switch 152 preferably defines the instruction unit, and the display 28b preferably defines the first and the second notification units. The CPU 158 also functions as the instruction unit, the determination unit, the first setting unit, the second setting unit and the estimation unit. The cut off unit includes the electrolyte films 106, the separators 112, the gaskets 114b, the stop valve 148 and the pipes P10, P11. The timer preferably includes the CPU 158 and the clock circuit 160. The fuel supply, which preferably is an aqueous solution supply in the present preferred embodiment, preferably includes the aqueous solution pump 140.

Next, description will cover a basic power generating operation of the fuel cell system 100.

When the main switch 152 is turned on, the fuel cell system 100 commences its operation. After its operation is commenced, and when the permission flag stored in the memory 162 is ON state and the charge rate of the secondary battery 134 becomes smaller than the predetermined value (about 40%, for example), the ON/OFF circuit 170 is turned on, whereby the cell stack 102 is connected with the secondary battery 134. Then, system components such as the aqueous solution pump 140 and the air pump 142 are started using electricity from the secondary battery 134, and thus power generation in the cell stack 102 is started.

Referring to FIG. 2, aqueous methanol solution in the aqueous solution tank 124 is pumped by the aqueous solution pump 140, and is supplied directly to the anode 108 in each of the fuel cells 104 which define the cell stack 102, via the pipes P3, P4 and the anode inlet I1.

Gas (primarily containing carbon dioxide, vaporized methanol and water vapor) in the aqueous solution tank 124 is supplied via the pipe P16 to the catch tank 138. The methanol vapor and water vapor are cooled in the catch tank 138, and the aqueous methanol solution obtained in the catch tank 138 is returned via the pipe P17 to the aqueous solution tank 124. On the other hand, gas (containing carbon dioxide, non-liquefied methanol and water vapor) in the catch tank 138 is supplied via the pipe P18 to the air chamber 144.

Meanwhile, air which is introduced by the air pump 142 via the pipes P7 enters the air chamber 144, where it is silenced. The air, etc. which was introduced to the air chamber 144 flows via the pipe P8 to the air pump 142, and then through the pipe P9, the stop valve 148, the pipe p10 and the cathode inlet I3, into the cathode 110 in each of the fuel cells 104 which define the cell stack 102.

At the anode 108 in each fuel cell 104, methanol and water in the supplied aqueous methanol solution chemically react with each other to produce carbon dioxide and hydrogen ions. The produced hydrogen ions flow to the cathode 110 via the electrolyte film 106, and electrochemically react with oxygen in the air supplied to the cathode 110, to produce water (water vapor) and electric energy. Thus, power generation is performed in each fuel cell 104, i.e., the cell stack 102. The temperature of the cell stack 102 is increased by heat from the various reactions, and the output from the cell stack 102 increases as the cell stack temperature increases. The fuel cell system 100 shifts to normal operation where constant power generation is possible, when the cell stack 102 attains to about 60° C., for example. The electricity from the cell stack 102 is used to charge the secondary battery 134, to drive the motorbike 10 and so on.

Carbon dioxide produced at the anode 108 of each fuel cell 104, and aqueous methanol solution including unused methanol are heated by the heat from the electrochemical reactions. The carbon dioxide and the aqueous methanol solution flow from the anode outlet I2 of the cell stack 102, through the pipe P5 into the radiator 116a, where they are cooled. The cooling of the carbon dioxide and the methanol is facilitated by driving the fan 118. The aqueous methanol solution from the radiator 116a flows through the pipe P6, and returns to the aqueous solution tank 124.

Meanwhile, most of the water vapor produced on the cathode 110 in each fuel cell 104 is liquefied and discharged in the form of water from the cathode outlet I4 of the cell stack 102, with saturated water vapor being discharged in the form of gas. The water vapor which was discharged from the cathode outlet I4 is supplied via the pipe P11 to the radiator 116b, where it is cooled and its portion is liquefied as its temperature decreases to or below the dew point. The liquefying operation of the water vapor by the radiator 116b is facilitated by operation of the fan 120. Discharge from the cathode outlet I4, which contains water (liquid water and water vapor), carbon dioxide and unused air, is supplied via the pipe P11, the radiator 116b and the pipe P12, to the water tank 126 where water is collected, and thereafter, discharged to outside via the pipe P13.

At the cathode 110 in each fuel cell 104, the vaporized methanol from the catch tank 138 and methanol which has moved to the cathode 110 due to crossover react with oxygen in the platinum catalyst layer 110a, thereby being decomposed to harmless substances of water and carbon dioxide. The water and carbon dioxide which are produced from the methanol are discharged from the cathode outlet I4, and supplied to the water tank 126 via the radiator 116b. Further, water which has moved due to water crossover to the cathode 110 in each fuel cell 104 is discharged from the cathode outlet I4, and supplied to the water tank 126 via the radiator 116b.

Water in the water tank 126 is pumped by the water pump 150 and supplied appropriately to the aqueous solution tank 124 via the pipes P14, P15. Based on a detection signal from the level sensor 130, the CPU 158 controls the water pump 150 so that aqueous methanol solution in the aqueous solution tank 124 will be maintained at a predetermined liquid level (a predetermined liquid amount).

Methanol fuel in the fuel tank 122 is pumped by the fuel pump 136 and supplied appropriately to the aqueous solution tank 124 via the pipes P1, P2. The CPU 158 controls the fuel pump 136 so that the aqueous methanol solution in the aqueous solution tank 124 will be maintained at a predetermined concentration, based on a concentration detected by using the voltage sensor 154.

The power generating operation as described is stopped when the operator (i.e., the driver of the motorbike 10 in the present preferred embodiment) turns off the main switch 152 thereby giving the CPU 158 a power generation stop command. Also, when the secondary battery 134 is fully charged (e.g., charge rate of about 98%, for example), the CPU 158 functions as the instruction unit, i.e., the CPU 158 gives itself a power generation stop command, and the power generating operation is stopped automatically.

Figure 6:
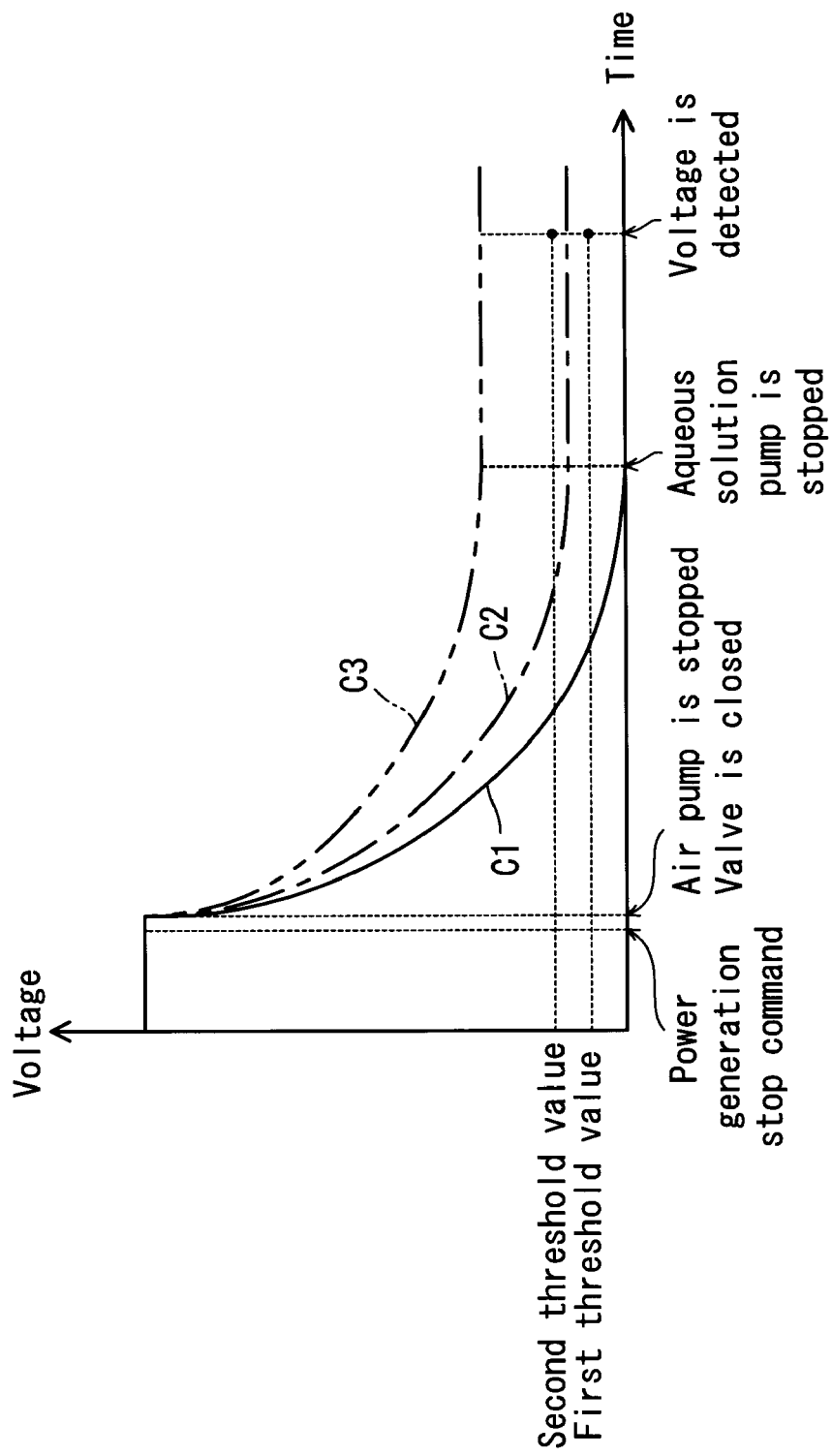
FIG. 6 is a graph which shows cell stack voltage changes when a power generating operation is stopped.

As the power generating operation is stopped, the air pump 142 is stopped, and the stop valve 148 is brought to a closed state. This causes a sharp drop, as shown in FIG. 6, in the voltage of the cell stack 102. In FIG. 6, Line C1 shows voltage changes in the cell stack 102 when all of the electrolyte films 106, the separators 112, the gaskets 114b, the stop valve 148, the pipes P10, P11, and other members (which constitute the oxidizer path) are sound. Line C2 shows voltage changes in the cell stack 102 when there is an abnormality in at least one of these members, which has caused air to flow into the cathode 110. Line C3 shows voltage changes in the cell stack 102 when there is a more serious abnormality in at least one of these members than in the case of Line C2.

If the electrolyte films 106, the separators 112, the gaskets 114b, the stop valve 148, the pipes P10, P11, etc. are all normal, and air supply is successfully cut off, oxygen in the air which remains in the path such as in the grooves of the separators 112 will eventually be depleted. As a result, the voltage in the cell stack 102 drops to 0 V (volt) as shown by Line C1 in FIG. 6.

On the other hand, if any of the electrolyte films 106, the separators 112, the gaskets 114b, the pipes P10, P11, etc. are damaged or the stop valve 148 is deteriorated, broken or otherwise abnormal, whereby external air flows (invades) into the cell stack 102, the air is supplied to the cathode(s) 110 in some of the fuel cells 104. In other words, it becomes impossible to cut off air supply because of abnormality, and the air is supplied to the cathode(s) 110 in some of the fuel cells 104. As a result, electrochemical reactions (power generation) continue, and as indicated by Line C2 and Line C3 in FIG. 6, the voltage in the cell stack 102 does not drop to 0 V. In this case, oxygen supply to the electrode 110b in the cathode 110 is not uniform in those particular fuel cells 104 where power generation continues, which causes localized electrochemical reactions and deterioration.

In the fuel cell system 100, the electrical variable regarding power generation (voltage in this embodiment) of the cell stack 102 (fuel cell 104) takes on different values depending on whether the air supply is cut off or not. Utilizing this, a determination is made whether or not external supply of air has been cut off after an issuance of a power generation stop command, based on a detection result from the power generation sensor 174. In other words, whether or not there is an abnormality in the electrolyte films 106, the separators 112, the gaskets 114b, the stop valve 148, the pipes P10, P11, etc. is determined based on a detection result from the power generation sensor 174.

Next, description will be made for an example of determination operation in the fuel cell system 100, with reference to FIG. 7. In this example, the main switch 152 is turned off by a human driver while power generating operation is underway. In the operation shown in FIG. 7, electric power necessary to drive the controller 146 including the CPU 158 and the power generation sensor 174 is covered by the secondary battery 134. Since the amount of power consumed by the controller 146 is small, there is no need for an external power source, etc., in order to perform the operation in FIG. 7.

First, as the main switch 152 is turned off during the power generating operation, a power generation stop command is given to the CPU 158, which then sets the ON/OFF circuit 170 to an OFF state (Step S1). This opens the electric circuit 164 to disconnect the cell stack 102 from the secondary battery 134, the electric motor 38 and the drive unit 40. In other words, the cell stack 102 is disconnected from various loads.

Subsequently, the CPU 158 stops the air pump 142, brings the stop valve 148 to a closed state (Step S3), and then waits for a lapse of a first predetermined time (10 seconds in this example) which is a preset length of time to be counted from the time of issuance of the power generation stop command (Step S5). The CPU 158 measures the time from the power generation stop command, based on the clock signal from the clock circuit 160. After the lapse of the first predetermined time from the power generation stop command, the CPU 158 stops the aqueous solution pump 140 (Step S7).

Subsequently, the CPU 158 waits for a lapse of a second predetermined time (15 seconds in this example) which is a preset length of time to be counted from the time of issuance of the power generation stop command (Step S9). After the lapse of the second predetermined time, the CPU 158 makes a detection of a voltage of the cell stack 102, using the power generation sensor 174 (Step S11). Then, the CPU 158 determines whether or not the detected voltage of the cell stack 102 is lower than the first threshold value (Step S13).

If air supply has been cut off, the voltage in the cell stack 102 comes to 0 V (see Line C1 in FIG. 6). Based on this, it is possible to determine whether or not there is any abnormality in the electrolyte films 106, the separators 112, the gaskets 114b, the stop valve 148, the pipes P10, P11, etc., by comparing the voltage of the cell stack 102 with the first threshold value, i.e., it is possible to determine if air supply has been successfully cut off. The first threshold value is a value which is greater than 0 volt, taking into account that the electrochemical reactions will continue even if the air supply has been cut off, using oxygen which is dissolved in aqueous methanol solution that has moved from the anode 108 as a result of crossover phenomenon for example. In the present preferred embodiment, the first threshold value is set to about 0.1 V, for example. It is preferable that the first threshold value should be smaller than a voltage value which is detected when there is an abnormality in at least one of the fuel cells 104.

If the detected voltage of the cell stack 102 is lower than the first threshold value (about 0.1 V in the present preferred embodiment), the process returns to Step S11 and repeats the determination in Step S13, until the main switch 152 is turned on in Step S15. In other words, as far as the system (the cut off unit) is determined to be normal (there is no abnormality), the process returns to Step 11 and repeats the determination in Step S13, until Step S15 determines that the main switch 152 has been turned on. Thereafter, the determination operation is stopped when the main switch 152 is turned on.

On the other hand, if the detected voltage of the cell stack 102 is not lower than the first threshold value, the CPU 158 determines whether or not this voltage value is lower than a second threshold value which is a value greater than the first threshold value (Step S17). In other words, when the system determines that there is an abnormality, the detected voltage is compared to the second threshold value.

If there is a serious abnormality which has caused an inflow of a large amount of air into the cell stack 102, voltage values in those fuel cells 104 which are generating power will be high. Based on this, a determination is made on a severity of the abnormality, by comparing the detected value with the predetermined second threshold value. The second threshold value is set to a value, as long as lower than which the system is anticipated to be capable of supplying oxygen uniformly to each of the cathodes 110 by driving the air pump 142 the next time the system is turned on to generate power. In the present preferred embodiment, the second threshold value is set to about 0.2 V, for example.

If the detected voltage of the cell stack 102 is lower than the second threshold value (about 0.2 V in the present preferred embodiment) (see Line C2 in FIG. 6), the CPU 158 notifies the driver of the abnormality by causing the display 28b to display a message which recommends inspection/replacement of each fuel cell 104, the stop valve 148, the pipes P10, P11, etc., for example (Step S19). Thereafter, the determination operation comes to an end.

On the other hand, if the detected voltage of the cell stack 102 is not lower than the second threshold values (for example, about 0.2 V in the present preferred embodiment) (see Line C3 in FIG. 6), the CPU 158 sets the permission flag, which is stored in the memory 162, to an OFF state (Step S21). When the detected voltage is not lower than the second threshold values, it is anticipated that driving the air pump 142 will not ensure uniform supply of oxygen to each cathode 110 because of the air leak. In such a case where there is anticipated a serious abnormality which will cause accelerated deterioration of the cell stack 102, the CPU 158 makes a setting for prohibiting the next power generating operation. Thereafter, the CPU 158 causes the display 28b to display a predetermined message, thereby notifying the driver that power generation will not be permitted next time (Step S23), and then brings the process to Step S19. In this case, Step S19 performs a power generation prohibition notification and an abnormality notification.

It should be noted here that even if the main switch 152 has not been turned off, the CPU 158 automatically recognizes that it has been given a power generation stop command, and performs the determination operation as described when the secondary battery 134 has become fully charged in the course of power generating operation. In other words, the determination operation is performed also in the case where power generating operation is stopped while the fuel cell system 100 is in operation. In this case, Step S15 determines whether or not the secondary battery 134 has attained a predetermined charge rate (for example, about 40% in the present preferred embodiment), and brings the process back to Step S11 until the predetermined rate is reached.

According to the fuel cell system 100 as has been described, it is possible to easily determine whether or not air supply to the cell stack 102 has been cut off after an issuance of power generation stop command, by utilizing a voltage of the cell stack 102 detected after the issuance of a power generation stop command.

If there is a serious abnormality which is likely to cause a major air leak that will prevent a uniform supply of oxygen to each of the cathodes 110 the next time of power generation, it is possible to reduce deterioration of the cell stack 102 by prohibiting the next power generation. The permission flag is set to an ON state when, for example, a reset button in the input portion 28c is pressed after an abnormality checkup and replacement procedure has been completed. This allows power generation the next time.

It is possible to easily and appropriately determine whether or not air supply has been successfully cut off, by a simple comparison of a detected voltage of the cell stack 102 with a predetermined first threshold value. Further, it is possible to easily and appropriately make a setting on permission or prohibition of the next power generation by a simple comparison of a detected voltage of the cell stack 102 with a predetermined second threshold value.

By making the voltage detection of the cell stack 102 after a lapse of the second predetermined time (15 seconds in this example) measured from the power generation stop command, it becomes possible to ensure that the voltage detection will be performed under a state where all residual oxygen has been depleted in the system if all of the electrolyte films 106, the separators 112, the gaskets 114b, the stop valve 148, the pipes P10, P11, etc., are normal (sound). This arrangement makes it possible to use a wide voltage gap between a normal case and an abnormal case of the cell stack 102, which then makes it possible to improve reliability of the determination.

After a power generation stop command, supply of aqueous methanol solution is continued to the anode 108 until a first predetermined time (10 seconds in this example) has passed. This ensures that all residual oxygen in the system will be utilized if the system (the cut off unit) is sound, making it possible to further improve reliability of the determination.

By displaying an abnormality notification message in the display 28b, the driver is given an opportunity to recognize presence of an abnormality and take necessary procedures. This helps reduce deterioration of the fuel cells 104 and the cell stack 102.

Since the fuel cell system 100 makes it simple to determine whether or not air supply to the cell stack 102 has been cut off, the fuel cell system 100 can be utilized suitably to the motorbike 10 in which pipes and other components are subject to early deterioration.

It should be noted here that the stop valve 148 may be brought to a closed state at any time after the air pump 142 has been stopped.

The stop timing of the aqueous solution pump 140 is not limited to a time point after the air pump 142 is stopped, but may be any time after a power generation stop command has been issued. For example, the aqueous solution pump 140 and the air pump 142 may be stopped simultaneously, or the aqueous solution pump 140 may be stopped before the air pump 142 is stopped.

Further, the voltage detection timing is not limited to a time point at the lapse of the second predetermined time (15 seconds in this example) after the issuance of a power generation stop command, but may be any time after a power generation stop command has been issued. For example, the voltage detection of the cell stack 102 may be made simultaneously as the stop valve 148 is brought to a closed state. In this case, there may be an arrangement that a voltage watch (monitoring) on the cell stack 102 is started as soon as the stop valve 148 is brought to the closed state, and a determination on presence/absence of an abnormality is made by checking the voltage drop amount (voltage drop rate).

It should be noted here that the first threshold value may be set to any value depending on characteristics of the electrochemical reactions in the fuel cells 104 after the air pump 142 is stopped. In the operation in FIG. 7, description was made for a case where the first threshold value is preferably set to about 0.1 V. However, the first threshold value may be set to 0 V.

Also in the operation in FIG. 7, description was made for a case where the second threshold value is preferably set to about 0.2 V. However, the second threshold value is not limited to this. The second threshold value may be set to any value, based on experiments for example, as long as it is lower than which the system is anticipated to be capable of supplying oxygen uniformly to each of the cathodes 110 when the air pump 142 is driven.

Next, description will be made for another example of determination operation in the fuel cell system 100, with reference to FIG. 8. It should be noted here that those steps in FIG. 7 and in FIG. 8 which are identical with each other are indicated by the same reference symbols, and description will not be repeated.

In the operation shown in FIG. 8, the power generation sensor 174 detects a voltage of each of the fuel cells 104 which constitute the cell stack 102 (Step S11a). Then, the CPU 158 determines whether or not the detected voltage values are not smaller than the first threshold value (Step S13a). If there is not any value which is not smaller than the first threshold value, the CPU 158 brings the process to Step S15. In other words, the process moves to Step S15 if the system (the cut off unit) is determined to be operating normally.

On the other hand, if the detected voltage values include a value which is not smaller than the first threshold value, the CPU 158 determines whether or not this value is not smaller than the second threshold value (Step S17a). In other words, the process moves to Step S17a if the system (the cut off unit) is determined to be operating abnormally. If Step S17a determines that the value is smaller than the second threshold value, the CPU 158 identifies a fuel cell 104 which gave the value, and estimates an abnormality location (Step S18).

In Step S18, it is estimated that the abnormality exists on the upstream side of the fuel cell 104a (including the fuel cell 104a) if the detected value which is not smaller than the first threshold value came from the fuel cell 104a (see FIG. 5) which is located at the upstream end. Specifically, the estimation is that the abnormality exists in the fuel cell 104a, the stop valve 148, the pipe P10 or the like. On the contrary, it is estimated that the abnormality exists on the downstream side of the fuel cell 104d (including the fuel cell 104d) if the detected value which is not smaller than the first threshold value came from the fuel cell 104d (see FIG. 5) which is located at the downstream end. Specifically, the estimation is that the abnormality exists in the fuel cell 104d, the pipe P11 or the like. Likewise, if the detected value which is not smaller than the first threshold value came from a fuel cell 104 other than the fuel cells 104a and 104d, it is estimated that the abnormality exists in that particular fuel cell 104.

Subsequently, the CPU 158 causes the display 28b to display a message which recommends inspection/replacement of the suspected parts/components, thereby notifying the driver of the location where the abnormality exists (Step S19a), and then brings the determination operation to an end.

If Step S17a determines that there is a fuel cell(s) 104 which gave a value not smaller than the second threshold value, the process moves to Steps S21 and S23, and then performs Steps S18 and S19a sequentially. In this case, Step S19a performs a power generation prohibition notification and an abnormality location notification.

Estimating an abnormality location and notifying the driver of the abnormality location as described helps reduce burden which is necessary for identifying the place where the abnormality exists.

Figure 9:
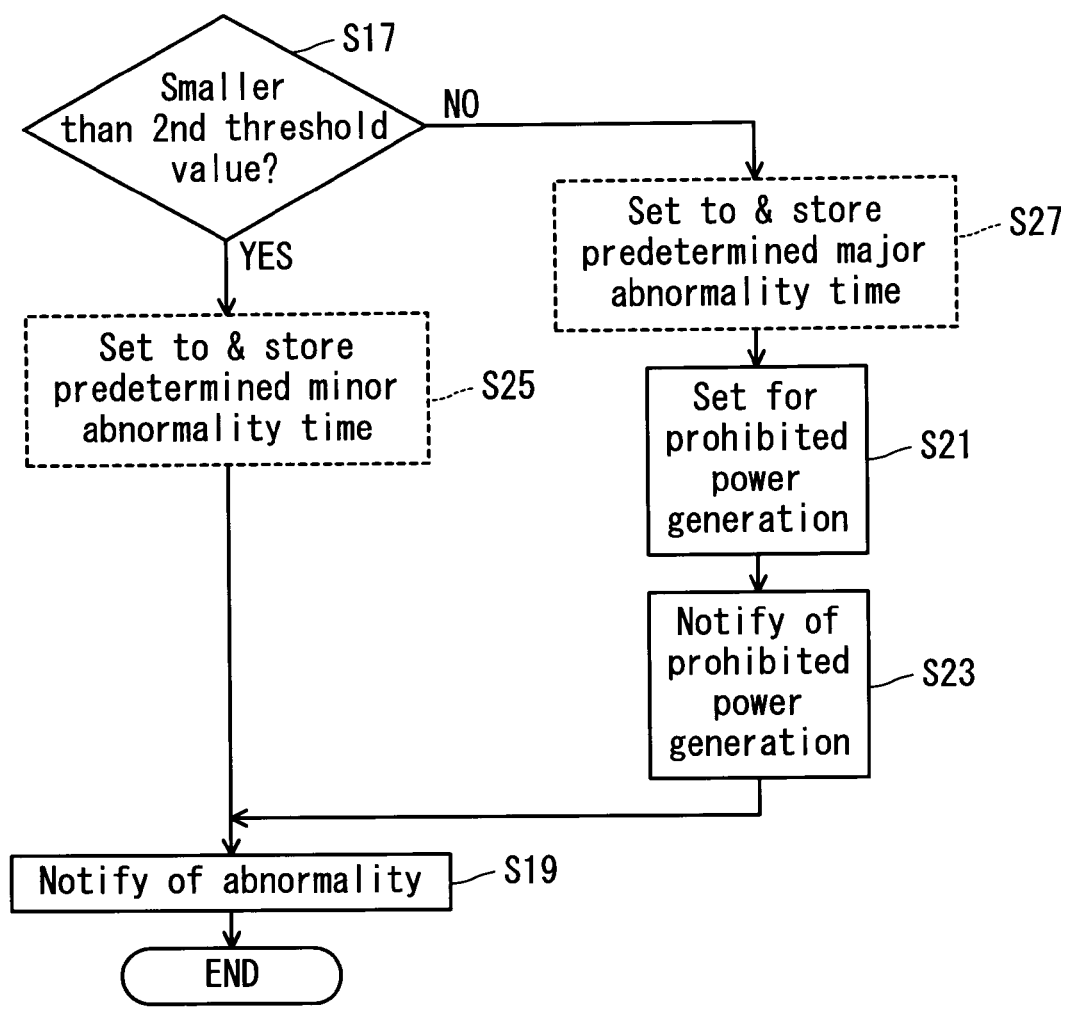
FIG. 9 is a flowchart which shows a main portion of a variation in the primary operation shown in FIG. 7.

It should be noted here that in the operation in FIG. 7, Step S17 may be followed by steps in FIG. 9, i.e., setting of a predetermined time (a time interval for performing an operation in FIG. 11) in accordance with the severity of the abnormality, and storage of the value in the memory 162. In this case, if Step S17 determines that the detected voltage of the cell stack 102 is lower than the second threshold value, the CPU 158 determines that the abnormality is minor, and selects a predetermined minor abnormality time (an hour for example). This predetermined time is stored in the memory 162 (Step S25), and then the process goes to Step S19. On the other hand, if Step S17 determines that the detected voltage of the cell stack 102 is not lower than the second threshold value, the CPU 158 determines that the abnormality is major, and selects a predetermined major abnormality time (about thirty minutes, for example). This time is stored in the memory 162 (Step S27), and then the process goes to Step S21.

Figure 10:
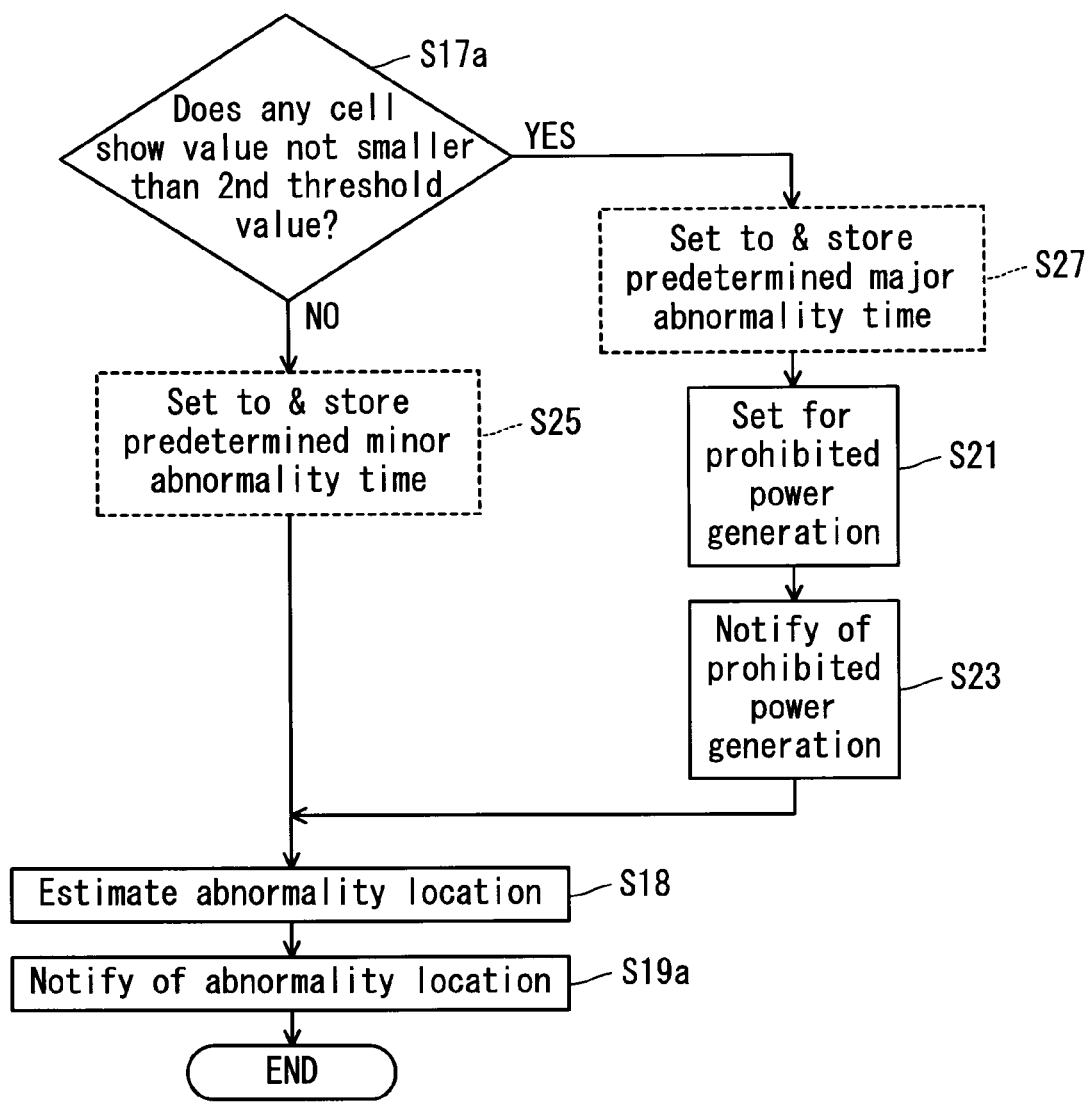
FIG. 10 is a flowchart which shows a main portion of a variation in the primary operation shown in FIG. 8.

Likewise, in the operation in FIG. 8, there may be an arrangement that Step S17a is followed by steps in FIG. 10, i.e., setting of a predetermined time (a time interval for performing an operation in FIG. 11) in accordance with the severity of the abnormality, and storage of the value in the memory 162. In this case, if Step S17a determines that the detected voltage of each fuel cell 104 is lower than the second threshold value, the CPU 158 determines that the abnormality is minor, and selects a predetermined minor abnormality time (an hour for example). This predetermined time is stored in the memory 162 (Step S25), and then the process goes to Step S18. On the other hand, if Step S17a determines that there is a fuel cell 104(s) which give a voltage not lower than the second threshold value, the CPU 158 determines that the abnormality is major, and selects a predetermined major abnormality time (thirty minutes for example). This predetermined time is stored in the memory 162 (Step S27), and then the process goes to Step S21.

Figure 11:
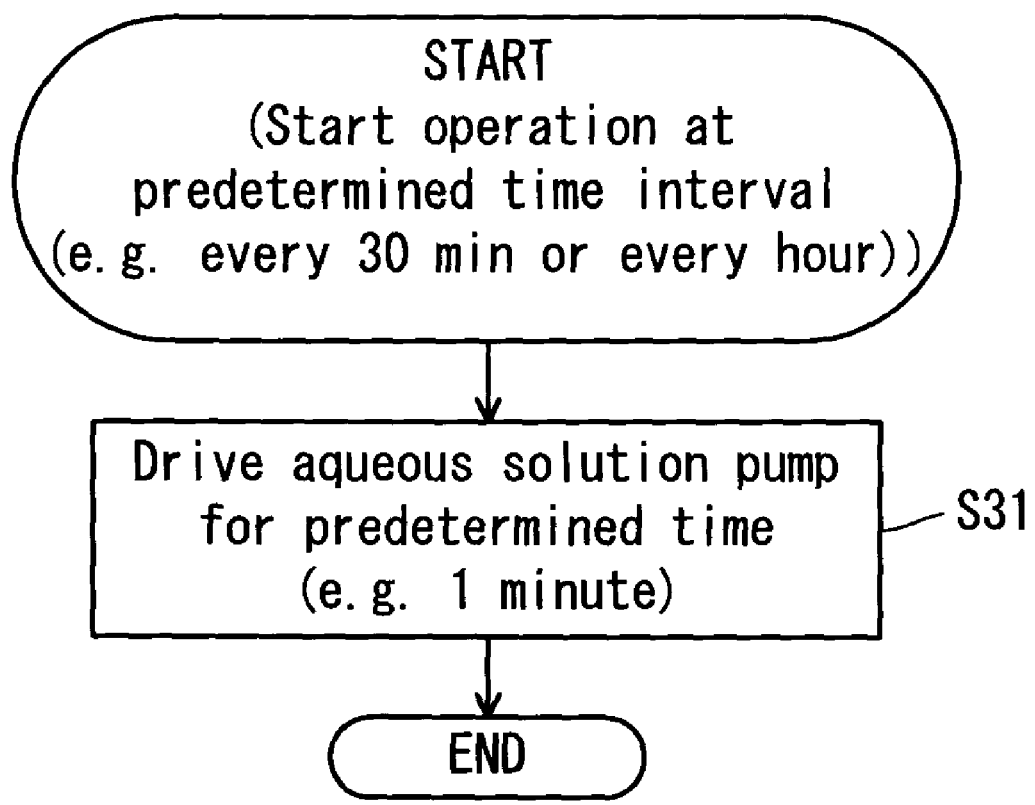
FIG. 11 is a flowchart which shows an example of an aqueous solution pump driving operation in the fuel cell system according to a preferred embodiment of the present invention.

In these cases, upon completion of the determination operation in FIG. 7 or in FIG. 8, the system starts counting down on the predetermined period of time which is stored in the memory 162, and the system performs the operation in FIG. 11 at the predetermined time interval until the next power generation is started.

In the present preferred embodiment, the operation in FIG. 11 is started every hour if the abnormality is minor, and every thirty minutes if the abnormality is major.

As the operation is started, the aqueous solution pump 140 is driven for a predetermined time (one minute for example) (Step S31), and then the operation comes to an end. The length of the predetermined time for which the aqueous solution pump 140 is driven is set to any value which is sufficient to uniformalize the fuel concentration in the anodes 108.

By supplying the fuel to the anodes 108 in such a way as described about, it becomes possible to prevent premature deterioration of the fuel cells 104 more effectively by correcting non-uniform fuel distribution in the fuel cells 104 even if the system has to be left without service for a long time after an abnormality is notified, due to reasons, for example, that the operator is too busy. Supplying the fuel to the anodes 108 at a predetermined time interval brings another advantage of even more efficient prevention of non-uniform fuel distribution in the fuel cells 104, and therefore deterioration prevention of the fuel cells. Further, by selecting a shorter time interval (predetermined time) for which the anodes 108 is supplied with fuel for a major abnormality than for a minor abnormality, it becomes possible to supply the anodes 108 with the fuel at an appropriate time interval according to the severity of abnormality in the cut off unit.

Further, in the above-described preferred embodiments, description was made for a case where the power generation sensor 174 is capable of detecting a voltage in each of the fuel cells 104. However, the present invention is not limited to this. For example, there may be an arrangement that voltage detection is made for the fuel cells 104a and 104d (see FIG. 5), as well as for those fuel cells 104 selected at a predetermined interval number. Another arrangement may be that for those fuel cells 104 between the fuel cells 104a and 104d, the measurement terminal 115 is provided on only those separators 112 selected at a predetermined interval number, for voltage measurement between two of the measurement terminals 115 (a voltage of a plurality of fuel cells 104). As far as it is possible to make a voltage detection for the fuel cells 104a, 104d, it is arbitrary whether or not to detect a voltage of other fuel cells 104. Since the fuel cells which constitute the cell stack 102 are connected in series, it is possible to detect a voltage of the cell stack 102 as far as it is possible to detect a voltage of the fuel cells 104a, 104d. Specifically, it is possible to detect the voltage of the cell stack 102 by measuring a voltage between the measurement terminal 115a which is for voltage detection of the fuel cell 104a and the measurement terminal 115e which is for voltage detection of the fuel cell 104d. If the power generation sensor 174 is connected with the fuel cells 104a, 104d only, the following estimation will be used; that if the cell stack 102 has a voltage which is not smaller than the first threshold value and the fuel cells 104a, 104d have a voltage which is smaller than the first threshold value, then an abnormality exists in a fuel cell(s) 104 between the fuel cells 104a and 104d (excluding the fuel cells 104a and 104d). Also, similarly to the operation in FIG. 8, a voltage value in the fuel cell 104a which is not smaller than the first threshold value indicates an abnormality existing on the upstream side of the fuel cell 104a (including the fuel cell 104a) whereas a voltage value in the fuel cell 104d which is not smaller than the first threshold value indicates an abnormality existing on the downstream side of the fuel cell 104d (including the fuel cell 104d).

As indicated by broken lines in FIG. 2, the pipe P11 may be provided with the stop valve 148a. This makes possible to cut off an inflow of air from the pipe P13 quickly and more reliably. Also, as indicated by broken lines in FIG. 2, the pipe P11 may be provided with a trap 149 which is a lower portion than the cell stack 102. As the trap 149 in the pipe P11 is filled with aqueous methanol solution, the inflow of air from the pipe P13 is also cut off.

In the above preferred embodiments, description was made for a case where the pipe P11 is filled thereby blocked with aqueous methanol solution. However, the location where the oxidizer path is blocked on the downstream side of the cathode outlet I4 is not limited to this. For example, there may be an arrangement that a path inside the radiator 116b is blocked by aqueous methanol solution which comes from the cathode outlet I4 after the air pump 142 is stopped. In this case, the radiator 116b is included also in the cut off unit. For another example, the pipe P12 may be provided with a trap. In this arrangement, the trap in the pipe P12 is filled with aqueous methanol solution which comes from the cathode outlet I4 after the air pump 142 is stopped. In this case, the cut off unit includes the radiator 116b and the pipe P12, too. Still, a further example may be to cut off an inflow of air into the pipe P12 by filling the water tank 126 (fully) with water from outside. In this case, the cut off unit preferably includes the radiator 116b, the pipe P12 and the water tank 126 as well.

It should be noted here that in the above preferred embodiments, description was made for a case where the stop valve 148 is preferably used. However, the stop valve 148 is not necessarily required. For example, in FIG. 2, a cathode inlet location may be made near the bottom of the cell stack 102 so that air is supplied from this cathode inlet to the cathode 110 in each fuel cell 104 via grooves provided accordingly in each separator 112. In this arrangement, after a stoppage of power generating operation, a pipe which is connected with the cathode inlet is filled with aqueous methanol solution, cutting off an inflow of air into the cathode inlet, even if the stop valve 148 is not provided.

Also, in the above preferred embodiments, description was made for a case where the electrical variable regarding power generation is provided by a voltage and detection is made for the voltage. However, the electrical variable is not limited to this. For example, after an issuance of power generation stop command, detection may be made for an electric current of the fuel cell as the electrical variable. In this case, the ON/OFF circuit 170 is turned on after Step S9 in FIG. 7 has determined YES, to detect a tapped current with the electric current detection circuit 168, and the detection result is compared with a predetermined threshold value. As another example, a resistance or an output (electric power) may be calculated by using a fuel cell voltage and a current of the fuel cell which are detected after an issuance of power generation stop command, and these may be used as the electrical variable for determinations.

Further, in the above-described preferred embodiments, fuel is provided by methanol, and aqueous fuel solution is provided by aqueous methanol solution. However, the present invention is not limited to this. For example, the fuel may be provided by ethanol or other alcoholic fuel whereas aqueous fuel solution may be provided by aqueous ethanol solution or other aqueous alcoholic solution.

It should be noted here that in the above preferred embodiments, description was made for a case where air which contains oxygen preferably is supplied forcibly by a gas supply (oxidizer supply) which includes the air pump 142. However, the present invention is not limited to this. The present invention is also applicable to passive fuel cell systems which do not include an air pump. The present invention is also applicable to fuel cell systems which use a refiner, as well as hydrogen fuel cell systems which use hydrogen gas as a fuel to be supplied to the fuel cell.

The fuel cell system according to various preferred embodiments of the present invention can be used suitably not only to motorbikes but also any other transportation equipment such as automobiles, marine vessels, etc.

Further, the present invention is applicable to stationary-type fuel cell systems, and moreover, to portable-type fuel cell systems which may be incorporated in electronic devices such as personal computers, mobile devices, etc.

The present invention being thus far described and illustrated in detail, it is obvious that these description and drawings only represent examples of the present invention, and should not be interpreted as limiting the invention. The scope of the present invention is only limited by words used in the accompanied claims.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A fuel cell system comprising:
a fuel cell including a cathode;
a detector arranged to detect an electrical variable regarding power generation in the fuel cell;
an instruction unit arranged to issue a power generation stop command for the fuel cell;
a cut off unit arranged to cut off a supply of gas containing oxidizer to the cathode after an issuance of the power generation stop command by the instruction unit; and
a determination unit programmed to determine a presence or an absence of an abnormality in the cut off unit based on a result of a comparison between a detection result from the detector and a first threshold value after the issuance of the power generation stop command; wherein
the determination unit determines that there is no abnormality in the cut off unit if the detection result from the detector is smaller than the first threshold value, and determines that there is an abnormality in the cut off unit if the detection result from the detector is not smaller than the first threshold value.

2. The fuel cell system according to claim 1, further comprising a first setting unit programmed to set a permission or a prohibition of a next power generation by the fuel cell, based on a detection result from the detector.

3. The fuel cell system according to claim 2, wherein the first setting unit is programmed to set the permission or prohibition for the next power generation by the fuel cell based on a result of a comparison between the detection result from the detector and a second threshold value which is greater than the first threshold value.

4. The fuel cell system according to claim 1, further comprising a timer arranged to measure a time from the issuance of the power generation stop command, wherein the determination unit determines the presence or absence of an abnormality in the cut off unit based on a detection result from the detector detected after a lapse of a predetermined time measured by the timer.

5. The fuel cell system according to claim 4, wherein the fuel cell further includes an anode, and the fuel cell system further comprises a fuel supply arranged to supply the anode with a fuel after the issuance of the power generation stop command.

6. The fuel cell system according to claim 1, wherein the fuel cell further includes an anode, and the fuel cell system further comprises a fuel supply arranged to supply the anode with a fuel after the determination unit determines the presence of an abnormality in the cut off unit.

7. The fuel cell system according to claim 6, wherein the fuel supply supplies the fuel to the anode at a predetermined time interval after the determination unit has determined the presence of an abnormality in the cut off unit.

8. The fuel cell system according to claim 7, further comprising a second setting unit programmed to set the predetermined time, wherein the second setting unit sets the predetermined time based on a result of a comparison between the detection result from the detector and a second threshold value which is greater than the first threshold value.

9. The fuel cell system according to claim 1, further comprising a first notification unit arranged to provide notification of a determination result from the determination unit.

10. The fuel cell system according to claim 1, further comprising a fuel cell stack which includes a plurality of the fuel cells, wherein the detector is arranged to detect an electrical variable from at least two of the fuel cells located respectively at an end and the other end of the fuel cell stack, and an estimation unit programmed to estimate an abnormality location in the cut off unit based on a plurality of detection results from the detector.

11. The fuel cell system according to claim 10, further comprising a second notification unit arranged to provide notification of an estimation result from the estimation unit.

12. Transportation equipment comprising the fuel cell system according to claim 1.

* * * * *